United States Patent [19]
Pfenning

[11] 4,149,429
[45] Apr. 17, 1979

[54] ADJUSTABLE GEAR ASSEMBLY

[75] Inventor: Helmut Pfenning, Mainz, Fed. Rep. of Germany

[73] Assignee: JENAer Glaswerk Schott & Gen., Fed. Rep. of Germany

[21] Appl. No.: 873,232

[22] Filed: Jan. 30, 1978

[30] Foreign Application Priority Data

Feb. 11, 1977 [DE] Fed. Rep. of Germany ... 7704073[U]

[51] Int. Cl.² .......................... F16H 1/14; F16H 55/18
[52] U.S. Cl. ........................................ 74/417; 74/409; 74/423
[58] Field of Search ........................... 74/417, 409, 423

[56] References Cited

U.S. PATENT DOCUMENTS

| 3,608,684 | 9/1971 | Shmanckas | 74/417 X |
| 3,857,301 | 12/1974 | Hanks et al. | 74/417 X |
| 3,901,098 | 8/1975 | Jinkins | 74/417 |

*Primary Examiner*—Leonard H. Gerin
*Attorney, Agent, or Firm*—Hill, Gross, Simpson, Van Santen, Steadman, Chiara & Simpson

[57] ABSTRACT

An adjustable gear train is disclosed wherein play in a train of intermeshing bevel gears is accommodated by forming one of the gears of two radially separated coaxial parts which are axially movable with respect to one another, one of the parts being gear toothed and the other of the parts forming a shaft for the toothed part.

7 Claims, 2 Drawing Figures

ADJUSTABLE GEAR ASSEMBLY

BACKGROUND OF THE INVENTION

1. Field of the Invention

This invention relates to gear trains, more particularly to an adjustable bevel gear train including a plurality of intermeshing bevel gears.

2. Prior Art

Gear trains involving a plurality of intermeshing bevel gears are known to the art. One particular application is found in industrial robots wherein the drive to the hand spindle is by means of a drive train which controls the point of application of the grasped load from a relatively remote point. The power transmission is, therefore, by means of shafts and gear units. In such constructions, a relatively large play can occur at the point of load application as a result of gear wear occurring over periods of use. In order to obtain the original precision of the robot, the play has to be corrected.

Elimination of gear play has heretofore been accomplished through the use of removable or insertable shims located within the gear train. When a bevel gear train has been utilized, one of the bevel gears has been provided with axial shims interposed between the gear and its housing mount. These axial shims can be changed in such a manner as to change the effective axial position of the gear, thereby allowing play to be taken up.

However, in order to change the axial position of the gear by means of a shim positioning, it is necessary to extensively disassemble the unit. This disassembly takes a considerable period of time and must be done by highly trained personnel. Additionally, because the shims have to be placed after removal of the shimmed gear, there is no guarantee that the correct technical adjustment will be made. As a consequent thereof, the timing of individual play corrections is often extended, partially due to lack of time in which to make the correction, and thus, the industrial robot is operated with increased play and results in increased imprecision such that the quota of rejected parts for the goods being handled by the robot is increased.

It would, therefore, be an advance in the art to provide a bevel gear train which is easily adjustable for the purpose of eliminating play between the gears.

SUMMARY OF THE INVENTION

EMBODIMENTS OF THE INVENTION

It is a primary object of this invention to provide an adjustable bevel gear train wherein the time required for removal of play is reduced while precision of the overall gear train is held on a uniform high plateau.

Moreover, it is an object of this invention to provide an adjustable bevel gear train which is constructed such that adjustment for the purpose of eliminating wear caused play is simplified, requiring relatively little time such that only short production breaks are required for maintenance of industrial robots equipped with the gear train.

It is a further object of this invention to provide such an adjustable bevel gear train which can be adjusted by moderately trained personnel.

The above objects are met in this invention by constructing at least one shaft of the gear train of two radially separated parts. One of the parts is a gear tooth part and the other is the shaft part. The toothed part is axially displaceable on the shaft part and is, therefore, movable in relation to its mating gear in order to alter the mesh of the teeth. In the preferred embodiment illustrated, there is a threaded connection between the two parts such that a relative rotation of the one part with respect to the other part will cause an axial displacement. Additionally, in the preferred embodiment, the two parts are maintained together through axially extending bolts which are equally circumferentially spaced around the axis of the two parts such that an increment of adjustment may be one or more bolt spaced angle rotations. By providing for attachment of other portions of the industrial robot to the end of the adjustable gear through the intermediary of equally spaced bolt attachments, equal in number and spacing to the axially extending bolts, it is assured that an adjustment for play will not result in any misalignment of parts at the output end of the gear train.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure, and in which:

DESCRIPTION OF THE PREFERRED EMBODIMENT

Figure 1:
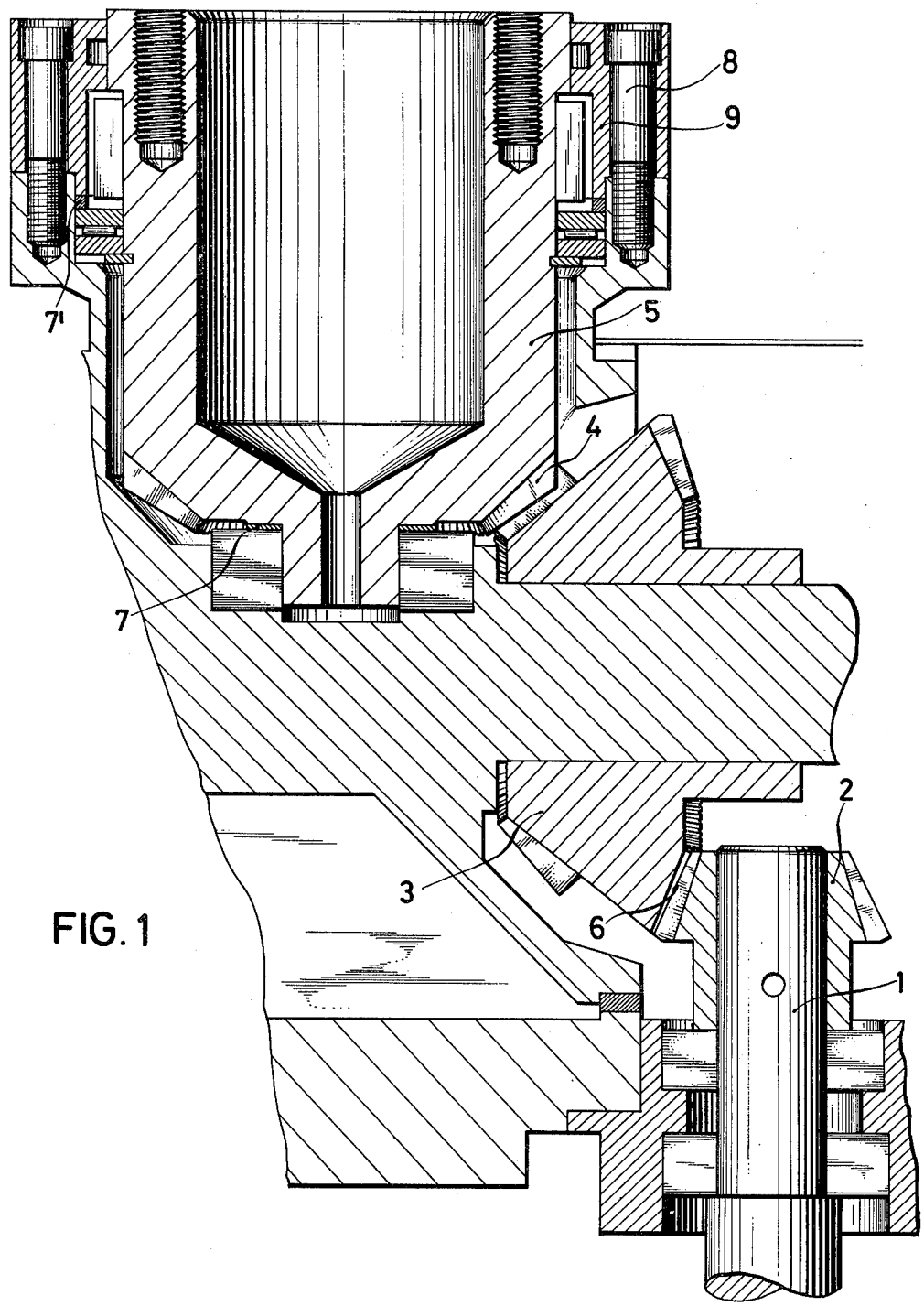
FIG. 1 is a fragmentary, sectional illustration of a prior art bevel gear train assembly.

A standard prior art adjustable bevel gear train is illustrated in section in FIG. 1. In such a setup, a drive is provided from shaft 1 through pinion gear 2 to an intermediate bevel gear 3 which is constructed as a double toothed gear. Drive proceeds through the mesh of teeth 3 and 4 to gear and shaft unit 5. The unit 5 is constructed as a bevel gear having threaded sockets for attachment of gripping devices, such as tongs or vacuum gripping members. Play which occurs due to wear in the mesh between teeth 4 and 6 will permit a rotation of the output end of the gear train relative to the input end such that the tool attached to the unit 5 can become out of alignment with the position of the shaft 1. In order to accommodate play, shims 7, 7' are provided. The height of the shims can be altered according to specific methods such that the shaft 5 which has been constructed as a bevel gear will be positioned closer to the intermediate bevel wheel 3 which in turn may therefore become positioned closer to the pinion 2. This results in a decrease of play between the teeth 4 and 6.

In order to adjust for play, in the existing construction, the shims 7 and 7' must be first removed and thereafter successively replaced by new sized shims. The required thickness of the replacing shims has to be determined in relation to the existing shims 7, 7' such that the existing shims are, effectively, reduced in thickness until an ideal positioning has been obtained. Since the replacement of the shims occurs after the unit 5 has been removed, it should be clear that the accurate choice of the new shims is often a matter of guess.

Frequently, in order to accomplish the correct final positioning of the unit 5, the shims must be replaced up to 6 times. The process takes about 2 hours and can only be carried out by highly qualified personnel. Even in that instance, correct adjustment of the position of the unit 5 is not assured.

Figure 2:
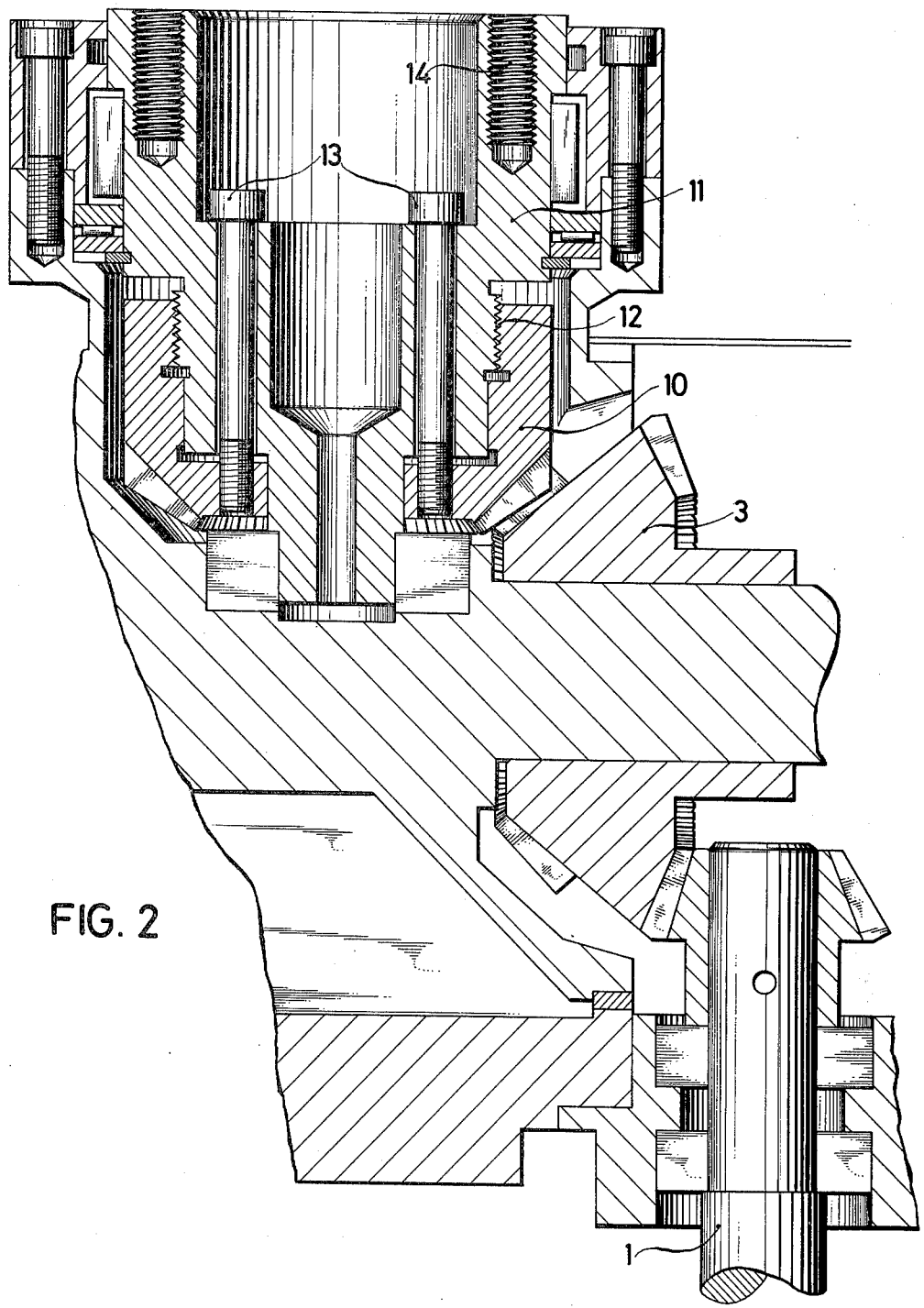
FIG. 2 is a fragmentary cross-sectional view of a bevel gear train modified according to this invention.

As illustrated in FIG. 2, according to this invention, adjustment may be provided in a similar gear train by replacing the unit 5 with an axially adjustable unit. In such an instance, the axially adjustable unit can be constructed of two parts, 10 and 11. The bevel gear teeth is formed at an axial end of the part 10 while the part 11 forms a shaft for the part 10 and provides for attachment of the tools to be manipulated by the gear train.

The two parts are preferably attached together through intermeshing teeth 12 having a very fine pitch. In this manner, rotation of one of the members with respect to the other member will cause the two members to move axially with respect to one another. The parts can be axially coupled through bolts 13 which may be received in slightly oversized bores whereby torque transmission will be due to the friction of the threads 12.

The robot tool is connected to the member 11 by means of threaded bores 14. The number of the bolts 13 is identical to the number of threaded bores 14 and the pitch angles of the two bolt circles are also identical.

It will be appreciated that adjustment of the gear train can now be provided through the simple expediency of removal of the bolts 13 and rotation of the member 11 relative to the member 10 such that the gear member 10 will be moved axially towards the intermediate gear 11 until play is reduced to the desired degree. Because the two members retain their connection to one another, play can be measured during this adjustment process.

Upon obtaining the desired play condition, the bolts 13 are reinserted. It will, therefore, be apparent that the smallest adjustment possible is a rotation which is equal to the pitch angle of the bolt circle. Thus, if four bolts are used, a quarter rotation would be the minimum. Due to the fine pitch of the threads 12, however, the necessity to make a rotation adjustment determined by the angle spacing between the bolts 13 is not problematical.

After insertion of the bolts 13, it will be seen that alignment of the shaft 1 to the gripping tool will be maintained because of the equal positioning of the threaded openings 14.

Of course, it will be apparent that other modifications may be made in this design. For example, torque transmission could be through the bolts 13. Additionally, torque transmission can be provided through the use of driving pins or the like.

It is an important factor that in constructions according to this invention, the gears do not have to be separated from one another in order to provide for adjustment. Thus, for example, it is not necessary to remove the screws 8 and cover 9. It can, therefore, be seen that play in the gear train illustrated, can be quickly adjusted even with the aid of relatively untrained personnel.

Although the teachings of my invention have herein been discussed with reference to specific theories and embodiments, it is to be understood that these are by way of illustration only and that others may wish to utilize my invention in different designs or applications.

I claim as my invention:

1. An adjustable bevel gear train comprising a plurality of intermeshing bevel gears with at least one of the bevel gears constructed of two radially separated parts with the first of the parts being provided with a geared surface and with the second of the parts providing a shaft for the first of the parts, the parts being axially displaceable with respect to one another, whereby movement of the geared parts towards and away from a mating gear is facilitated.

2. A gear train according to claim 1, wherein the two parts are joined together through concentric threads whereby axial position of the one part with respect to the other part can be adjusted by rotation of the parts relative to one another.

3. A gear train according to claim 2, wherein the parts are axially connected together by bolts.

4. A gear train according to claim 3, wherein the shaft part is provided with a plurality of threaded openings for attachment of members to be rotated by the gear train, the threaded openings corresponding in number and in relative angular positioning with the bolts.

5. A gear train according to claim 2, wherein the thread pitch is fine.

6. A gear train according to claim 4, wherein the thread pitch is fine.

7. An adjustable bevel gear comprising a radially inner shaft portion and a radially outer separate gear portion, the gear portion having a radially inturned ledge overlying an axial face ledge of the shaft portion, the gear portion having outer bevel gearing thereon, a circumferential threaded connection between the two portions whereby rotation of the portions relative to one another will cause an axial displacement of the portions relative to one another, a plurality of axial bolts connecting the two portions at the overlapping ledges, the shaft portion having an axial end attachment face, a plurality of threaded openings in said axial end attachment face for attachment of tools to be moved by the gear, the threaded openings corresponding in number and relative angular position to the bolts.

* * * * *